(12) United States Patent
Velona

(10) Patent No.: US 8,078,520 B2
(45) Date of Patent: *Dec. 13, 2011

(54) EDUCATIONAL TUITION SECURITIES SYSTEM

(76) Inventor: Diane Velona, Hillsborough, NJ (US)

( * ) Notice: Subject to any disclaimer, the term of this patent is extended or adjusted under 35 U.S.C. 154(b) by 653 days.

This patent is subject to a terminal disclaimer.

(21) Appl. No.: 12/099,454

(22) Filed: Apr. 8, 2008

(65) Prior Publication Data

US 2008/0235129 A1  Sep. 25, 2008

Related U.S. Application Data

(63) Continuation-in-part of application No. 10/951,434, filed on Sep. 28, 2004, now Pat. No. 7,809,618.

(51) Int. Cl.
*G06Q 40/00* (2006.01)
(52) U.S. Cl. .................... 705/36 R; 705/35; 705/37
(58) Field of Classification Search .............. 705/36
See application file for complete search history.

(56) References Cited

U.S. PATENT DOCUMENTS

| | | | |
|---|---|---|---|
| 4,787,036 A | 11/1988 | Fleming | |
| 5,745,885 A | 4/1998 | Mottola et al. | |
| 5,806,048 A | 9/1998 | Kiron et al. | |
| 5,809,484 A | 9/1998 | Mottola et al. | |
| 6,134,535 A * | 10/2000 | Belzberg | 705/36 R |
| 6,424,952 B1 * | 7/2002 | Yinbal | 705/36 R |
| 2002/0042767 A1 * | 4/2002 | Kwan | 705/36 |
| 2003/0115124 A1 * | 6/2003 | Gonzalez | 705/36 |
| 2003/0163402 A1 | 8/2003 | Kincart | |
| 2004/0073480 A1 | 4/2004 | Nahmias | |
| 2006/0074796 A1 | 4/2006 | Velona | |

OTHER PUBLICATIONS

Office Action from pending Priority Application No. 10/951,434, mailed Aug. 21, 2008, and Applicant's "Response to Office Action filed Jan. 21, 2009" (28 pages).
Interview Summary from pending Priority Application No. 10/951,434, mailed Dec. 22, 2008, (3 pages).
Printout from Education Week website (6 pages) http://www.edweek.org/ew/ewstory.cfm?slug=05prepaid.h22.
Printout from Financial-Planning.com website (2 pages) http://www.financial-planning.com/pubs/fp/20030401006.html.
Printout from the Motely Fool website (3 pages) http://www.fool.com/news/commentary/2004/commentary040526bm.htm?npu=y.
Printout from International Money Fund website (9 pages) http://www.imf.org/external/pubs/ft/fandd/2001/03/ketkar.htm.
Printout from Investorwords.com website (6 pages) http://www.investorwords.com.
Printout from On Wall Street website (2 pages) http://www.onwallstreet.com/detail.cfm?page=/pubs/ows/19980401047.html.
Printout from Raymond James website (1 page) http://www.raymondjamesecm.com/ipo410_main.asp.

(Continued)

*Primary Examiner* — Thomas Dixon
*Assistant Examiner* — Benjamin S Fields
(74) *Attorney, Agent, or Firm* — McCarter & English, LLP (57) ABSTRACT

An educational tuition securities system is provided. An educational institution can securitize tuition or course credits into tuition shares. Tuition shares in an educational institution can be purchased for a student and redeemed for payment of tuition credits or education costs at the educational institution. Tuition shares for an educational institution can be traded for tuition shares of another institution. Redeemed tuition shares can be used to pay for undergraduate and graduate education costs, or could be redeemed for cash. The invention provides a mechanism for paying future education costs, as well as for investing in educational institutions.

23 Claims, 5 Drawing Sheets

OTHER PUBLICATIONS

Printout from Registered Rep website (2 pages) http://www.registeredrep.com/mag/finance_whats_wrong_prepaid/.

Printout from Smartmoney.com website (4 pages) http://www.smartmoney.com/mag/index.cfm?story=august03-529.

Printout from Trusts & Estates website (3 pages) http://www.trustsandestates.com/ microsites/newsarticle.asp?mode=print&newsarticle=2671532& releaseid=&srid=11655&magazineid=150& siteid=16.

Printout from USA Today website (4 pages) http://www.usatoday.com/money/wealth/saving/msw138.htm.

Edwards, "Patent Backed Securitization: Blueprint for a New Asset Class." (11 pages).

Printout from CFO.com website (3 pages) http://www.cfo.com/Article?article=9621.

Illinois Student Assistance Commission, College Illinois! Asset/Liability Study (marked Jan. 31, 2003), available at http://www.collegezone.com/media/agenda01-03_Item10.pdf (2 pages).

Structured Finance, Universidad Diego Portales (identifying an "issue date" of May 9, 2003), available at www.ifc.org/ifcext/treasury.nsf/AttachmentsByTitle/SF_UDP/$FILE/UDP.pdf (2 pages).

International Finance Corporation, World Bank Group, Global Securitisation Review 2005-2006 (further discussing the Universidad Diego Portales identified in No. 23 above as being associated with an "issue date" of May 9, 2003), available at www.ifc.org/ifcext/treasury.nsf/attachmentsbytitle/sf_euromoney2005/$file/globalsecuritisationreview2005.pdf (8 pages).

Savings for College Through College Tuition, available at http://www.jimreal.com/qtpfnprt.html (marked "Copyright (c) 2002") (5 pages).

Tuition Plan Consortium, Independent 529 Plan, www.independent529plan.org, e.g., "Independent 529 Plan Available to Public: A New Way to Pay for Private College at Less Than Today's Prices" available at http://www.independent529plan.org/news/story_090303.html (marked Sep. 3, 2003) (3 pages) and "How Independent 529 Plan Works" available at http://www.independent529plan.org/howitworks_mail.html. (3 pages).

From Priority U.S. Appl. No. 10/951,434: First Office Action mailed Dec. 13, 2007 and Applicant's "Response to Office Action Mailed Dec. 13, 2007" (collectively 47 pages).

From Priority U.S. Appl. No. 10/951,434: Second Office Action mailed May 12, 2008 and Applicant's "Response to Final Office Action Mailed May 12, 2008" (collectively 38 pages).

Office Action from issued priority Patent No. 7,809,618 mailed May 7, 2009 (14 pages).

Interview Summary from issued priority Patent No. 7,809,618 mailed Jul. 20, 2009 (5 pages).

Notice of Allowance from issued priority Patent No. 7,809,618 mailed Feb. 2, 2010 (12 pages).

* cited by examiner

EDUCATIONAL TUITION SECURITIES SYSTEM

CROSS-REFERENCE TO RELATED APPLICATIONS

The present application is a continuation-in-part of U.S. application Ser. No. 10/951,434, filed Sep. 28, 2004 now U.S. Pat. No. 7,809,618, the contents of which are hereby incorporated by reference in their entirety for all purposes.

FIELD OF THE INVENTION

The present invention relates to an educational tuition securities system, wherein securities are issued by an educational institution, can be freely traded on an exchange, and can be redeemed for payment of fees at the educational institution.

BACKGROUND OF THE INVENTION

The ability to pay for the college education of a child is a significant concern for most parents. Tuition costs for college education continue to increase on a yearly basis at public and private institutions, including costs for room and board. In many instances, parents begin saving for a child's future college tuition when the child is at a young age.

Even though parents may be able to save money for a child's education, quite frequently, the amount saved is insufficient to pay for the entire cost of a child's college education. Further, funds for college education can be saved in low interest-bearing accounts (e.g., savings, certificate of deposit, money market accounts, etc.) that preserve principal, but do not yield a high rate of return. Other funds are invested in brokerage accounts (e.g. 529 plans and Coverdell Education Savings Accounts, of which Coverdell Accounts have a maximum contribution of $2,000 per year depending on annual income). Such accounts may consist of stocks, bonds, mutual funds, etc., which places assets at higher risk because principal can be lost and asset value is linked to economic market conditions that may not return desired investment results. State-sponsored pre-paid tuition plans represent another investment vehicle for paying education costs, but such plans are not offered by all states. Further, in some states, plans are limited to public educational institutions within a given state and require state residency. Pre-paid tuition gifts allow family members to purchase tuition at a current price to be used in the future, but if the child does not attend or withdraws from the institution the funds remain with the institution.

Often times, relatives wish to contribute to future education costs by giving gifts of money at special occasions, such as birthdays, etc. This money, however, is seldom reserved by the receiver exclusively for education costs. Rather, it is put into general funds and used as needed or desired.

Moreover, although student loans may provide sufficient capital to pay for the remainder (if not the entirety) of higher education costs, many students are left at graduation with significant debt. This can be particularly burdensome on a recent college graduate, especially if the graduate is not able to immediately find work and/or desires to enroll in graduate school. Thus, in today's education market, students are faced with increasing debt loads and parents are not provided with a means for affording higher education for their children without putting themselves or their children in debt.

Educational institutions are very highly esteemed by the public. The value of education is always increasing, and the cost of education is always rising. Despite the good will and ever-increasing value, there is no known mechanism for investing in educational institutions.

Accordingly, what would be desirable, but has not yet been provided, is an educational tuition securities system, wherein tuition shares can be purchased for investment or for others, freely traded on an exchange, and redeemed for payment of education fees at a desired educational institution.

SUMMARY OF THE INVENTION

The present invention provides an educational tuition securities system that allows for the trading of educational shares. An educational institution, such as a public or private college or university, can securitize tuition or course credits and issue tuition shares in the educational institution. The tuition shares could be sold in an initial public offering, using one or more underwriters and one or more broker/dealers. Further, the institution could offer the tuition shares in any known manner, such as in a public or private auction including a Dutch auction or descending price auction, or a manner developed in the future. Investors could be comprised of parents, relatives, others that gift the tuition shares to a future or current student, future or current students themselves, as well as others interested in investing for profit.

As another example, investors could be comprised of corporations, businesses or other employers, such as where the corporation has a tuition reimbursement plan or tuition assistance program for employees and desires to further extend such program by using tuition shares to cover the tuition of its employees. In such circumstances, it is contemplated that the selected tuition shares are those which are associated with an educational institution that is geographically near, e.g., within reasonable commuting distances, of an office of the employer. Of course, other educational institutions could be utilized and it is even possible that an employee could choose the institution from a number of choices. The employer could establish a brokerage account where tuition shares are held in the employer's name for future benefit of its employees. Employees could obtain appropriate approvals and the employer would then redeem tuition shares to pay for a course at the educational institution. Other arrangements for holding, transferring and using the tuition shares are also within the scope of the invention. For example, Lifelong Accounts (LiLA) could be used. Similar to a 401(k), this account is held in the employee's name, and can be used by the employee to cover education costs. The employer could match employee contributions. Employers could even outsource their tuition assistance programs to third parties such as The Council for Adult & Experiential Learning (CAEL). CAEL, or a similar organization, could implement tuition share redemptions on behalf of the employer.

As yet another example, investors could be comprised of alumni groups, scholarship funds, foundations, and/or other awarding entities that grant educational awards for study. The awarding entity could establish a brokerage account where tuition shares are held. Beneficiaries can be awarded tuition shares that they can redeem for their courses of study.

Tuition shares can be redeemed at the educational institution for tuition credit at the institution, or for cash if permitted by the educational institution. For example, shares might be electronically and/or physically returned to the educational institution in exchange for enrollment and/or participation in a class associated with the number of credits corresponding to the redeemed shares. Also, tuition shares could be traded for tuition shares in another institution.

The present invention also provides a method for paying for tuition at an educational institution. The method comprises the steps of allowing an investor to purchase one or more tuition shares for a student; gifting the one or more tuition shares to the student; receiving the one or more tuition shares; and redeeming the one or more tuition shares to pay for tuition fees at the educational institution.

The present invention further provides a method of investing in educational institutions. The method comprises the steps of purchasing one or more tuition shares in an educational institution, the tuition shares being redeemable for tuition credits at the institution; allowing the one or more tuition shares to appreciate with time; and selling or trading of the tuition shares.

The present invention further provides for paying a dividend to the investor in the form of additional tuition shares. The dividend can be cash or other funds, though it is contemplated that the dividend can be paid in the form of tuition shares. For example, the holder of one tuition share might receive a dividend in the form of additional tuition shares, such as one-tenth of a tuition share, two tuition shares, etc. The dividend can be paid on a recurring basis, such as quarterly, for example.

BRIEF DESCRIPTION OF THE DRAWINGS

Other important objects and features of the invention will be apparent from the following Detailed Description of the Invention taken in connection with the accompanying drawings in which.

DETAILED DESCRIPTION OF THE INVENTION

The present invention provides an educational tuition securities system, wherein tuition shares can be issued by an educational institution and can be purchased by investors. The term "tuition shares," is defined herein as "shares" that are issued by an educational institution and which can be purchased by investors. The term "tuition credit" is defined herein as the cost of education course credit at a university. "Education costs" include any and all costs associated with a student's education, including but not limited to, course credit, room-and-board, books, meals, supplies, or any other associated cost. A future or current student can redeem the tuition shares for tuition credit or payment of education costs. An investor could trade the tuition shares on an exchange. The tuition shares can be issued by one or more underwriters in an initial public offering. Further, the institution could offer the tuition shares in any known manner or manner developed in the future, such as in a public or private auction including a Dutch auction or descending price auction. Broker/dealers can establish brokerage accounts for individual investors. Shares for an educational institution can be traded for shares of another institution. Redeemed shares can be used to pay for tuition credits and/or education costs for undergraduate or graduate studies at an educational institution. Shares can be redeemed for tuition credits and/or education costs regardless of student status (e.g., part-time or full-time). One of ordinary skill in the art shall understand from the network diagrams shown and described that each method, system, and/or constituent thereof can be accomplished by utilizing a computerized network.

Figure 1:
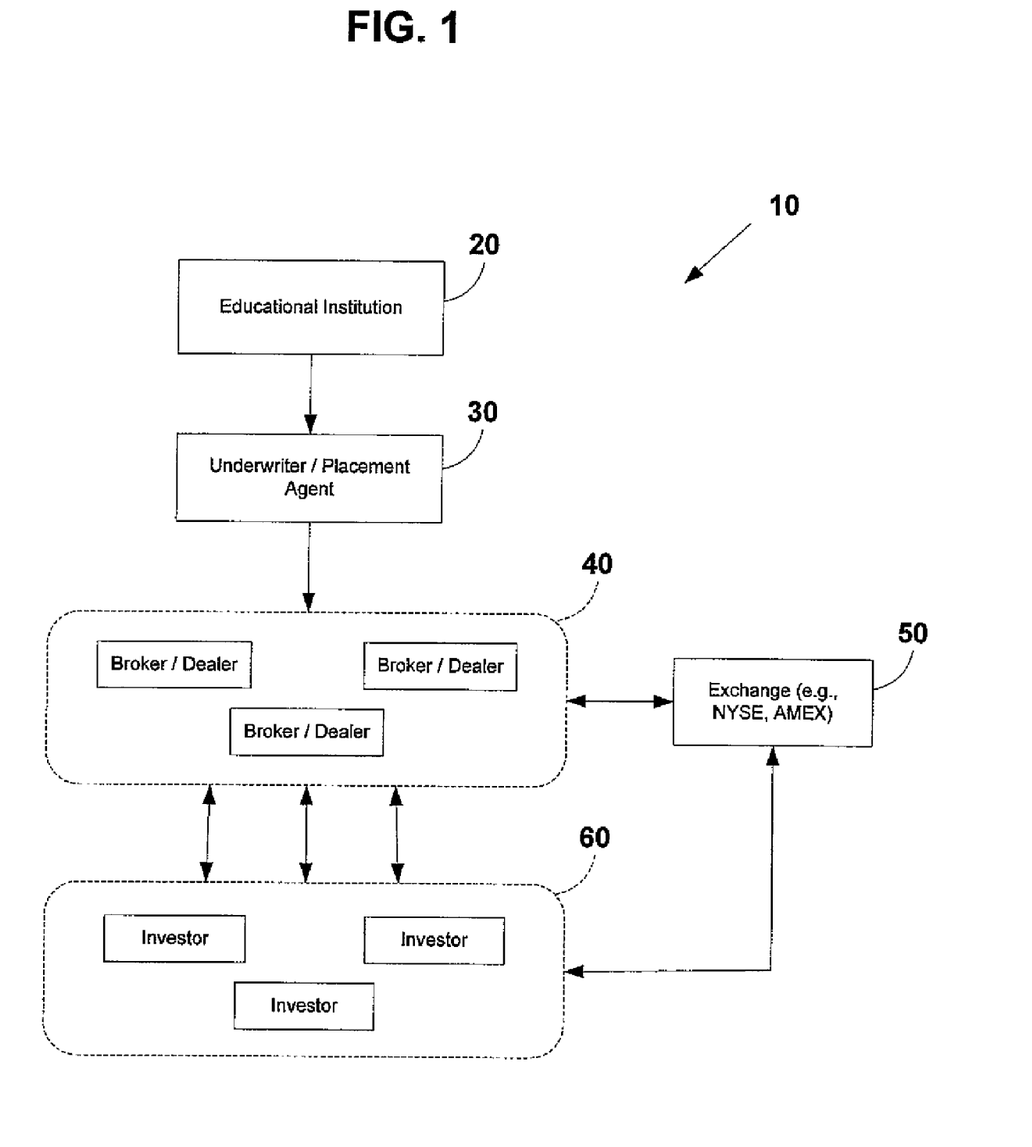
FIG. 1 is a diagram showing the educational tuition securities system of the present invention, wherein an initial public offering of tuition shares is made by an educational institution and sold to investors.

FIG. 1 is a diagram showing the educational tuition securities system of the present invention, indicated generally at 10, wherein an initial public offering of tuition shares is made by an educational institution and sold to investors. By the term "investors," it is meant parents, relatives, and others that gift the tuition shares to a future or current student, future or current students themselves, as well as others interested in investing for profit. An educational institution 20, such as a public or a private college or university, can issue a fixed number of tuition shares in the institution. It is contemplated that the educational institution 20 might, for example, make such a decision after having determined a need for more capital and having decided to sell future college courses, e.g., tuition credit, at present day value. An institution's tuition shares can be freely traded on an exchange. The tuition shares could have an established face value, which could be all or a fraction of the cost of a tuition credit or complete tuition at the educational institution. The tuition share prices can fluctuate based upon market demand. An underwriter or placement agent 30 could be utilized to issue shares in an initial public offering. The institution 20 can participate in a single initial public offering and then cease issuing future tuition shares, or could issue additional tuition shares in the future. The underwriter 30 coordinates with a plurality of broker/dealers 40 to issue the tuition shares to the public.

The underwriter 30 could comprise any desired broker/dealers that are licensed to trade securities on a public market, or a separate class of broker/dealers can be utilized. In some embodiments, the underwriters, e.g., placement agents, convert the college courses into marketable securities, e.g., tuition shares. One or more investors 60 can purchase tuition shares directly from the broker/dealers 40 prior to the initial public offering and shares can be transferred to the investor's account on the launch date. On the launch date, unsold shares could be purchased by the investors 60 over an exchange 50, such as an existing exchange (e.g., the New York Stock Exchange (NYSE) or American Stock Exchange (AMEX)), or a newly-created exchange. A standard brokerage account could be established by the broker/dealers 40 for each investor 60, and the purchased tuition shares allocated to each account. Moreover, a number of tuition shares corresponding to a plurality of educational institutions, e.g., diverse or disparate educational institutions, could be purchased and allocated to a brokerage account, thereby providing investors with a portfolio of educational investments. Additionally, the tuition shares could correspond to both public and private institutions.

Figure 2:
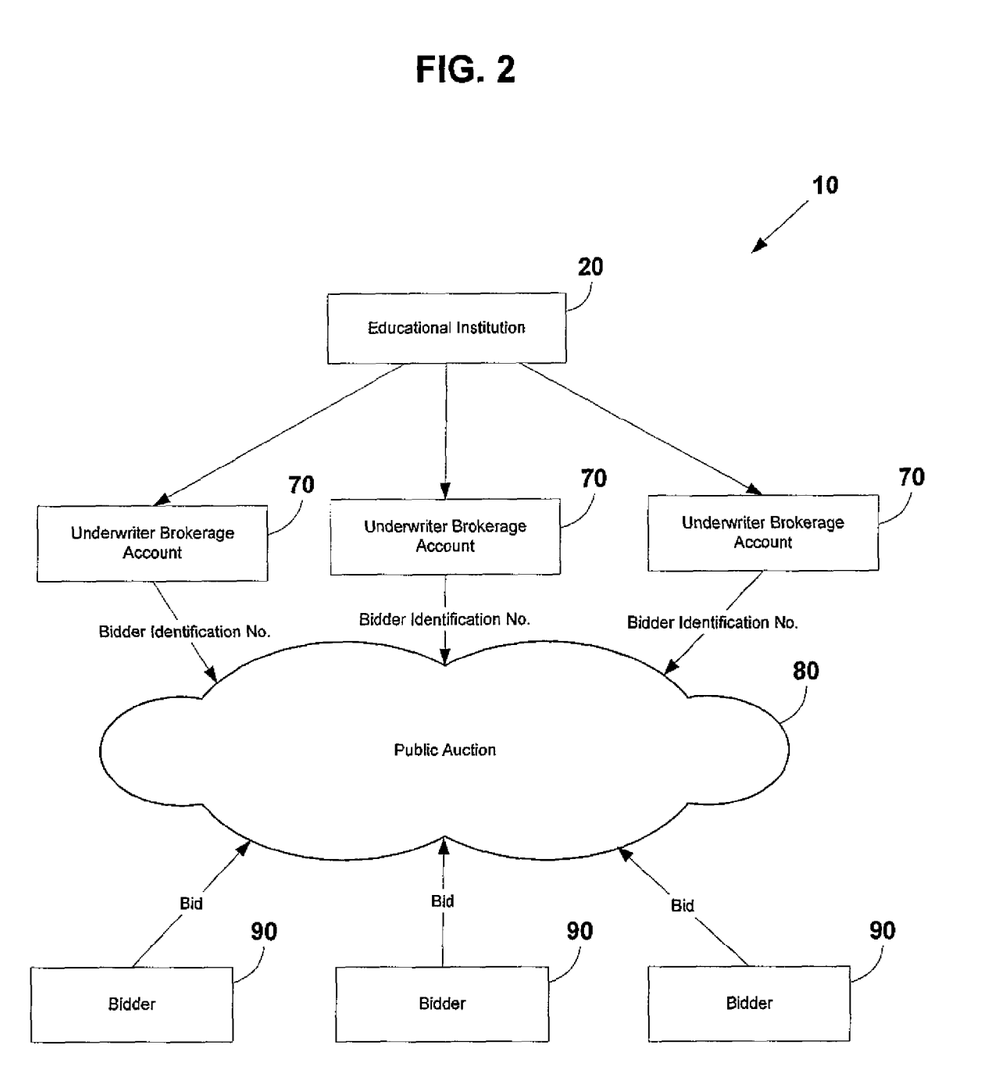
FIG. 2 is a diagram showing the educational tuition securities system of the present invention, wherein a public auction is conducted to sell tuition shares on the open market.

FIG. 2 is a diagram showing the educational tuition securities system 10 of the present invention, wherein a public auction is conducted to sell tuition shares on an open market. The educational institution 20 can conduct a public auction to sell tuition shares. The auction could be any desired form of auction, such as a Dutch auction or descending price auction. The educational institution 20 issues tuition shares to one or more authorized underwriters, each of which establishes a brokerage account 70. One or more bidders 90 can participate in the auction 80 by opening an account with the one or more authorized underwriters and obtaining a bidder identification number. The bidders could comprise investors or broker/dealers. The bidder identification numbers are only issued to the bidders 90 prior to the opening of the auction 80. When the auction 80 is opened, no bidder identification numbers are issued, and each of the bidders submits a bid. When the auction closes, shares are traded to the winning bidders. Each bidder can then notify the broker/dealer with whom and/or where the bidder's account is located, so that additional shares can be purchased or sold via an exchange to other investors, as discussed earlier with respect to FIG. 1.

In the case of a Dutch auction (similar to the auction conducted for Google, Inc.'s initial public offering), no placement agent is required. Each bidder submits a bid that includes the number of shares bid and a desired price per share. The bids are concealed from each bidder. Once the auction has closed, the shares are allocated to each bidder based upon the number of shares identified in each respective bidder's bid. The lowest bid price in the auction is then identified. Each bidder that submitted a bid higher than the lowest bid price is granted the shares allocated to the bidder. Rather than paying the price identified in the bidder's bid, the bidder pays a share price that is equal to the lowest bid. It should be noted that the auction need not be limited to a public auction, and that a private auction could be conducted. The initial public offering of Google, Inc. is an example of a Dutch auction.

Figure 3:
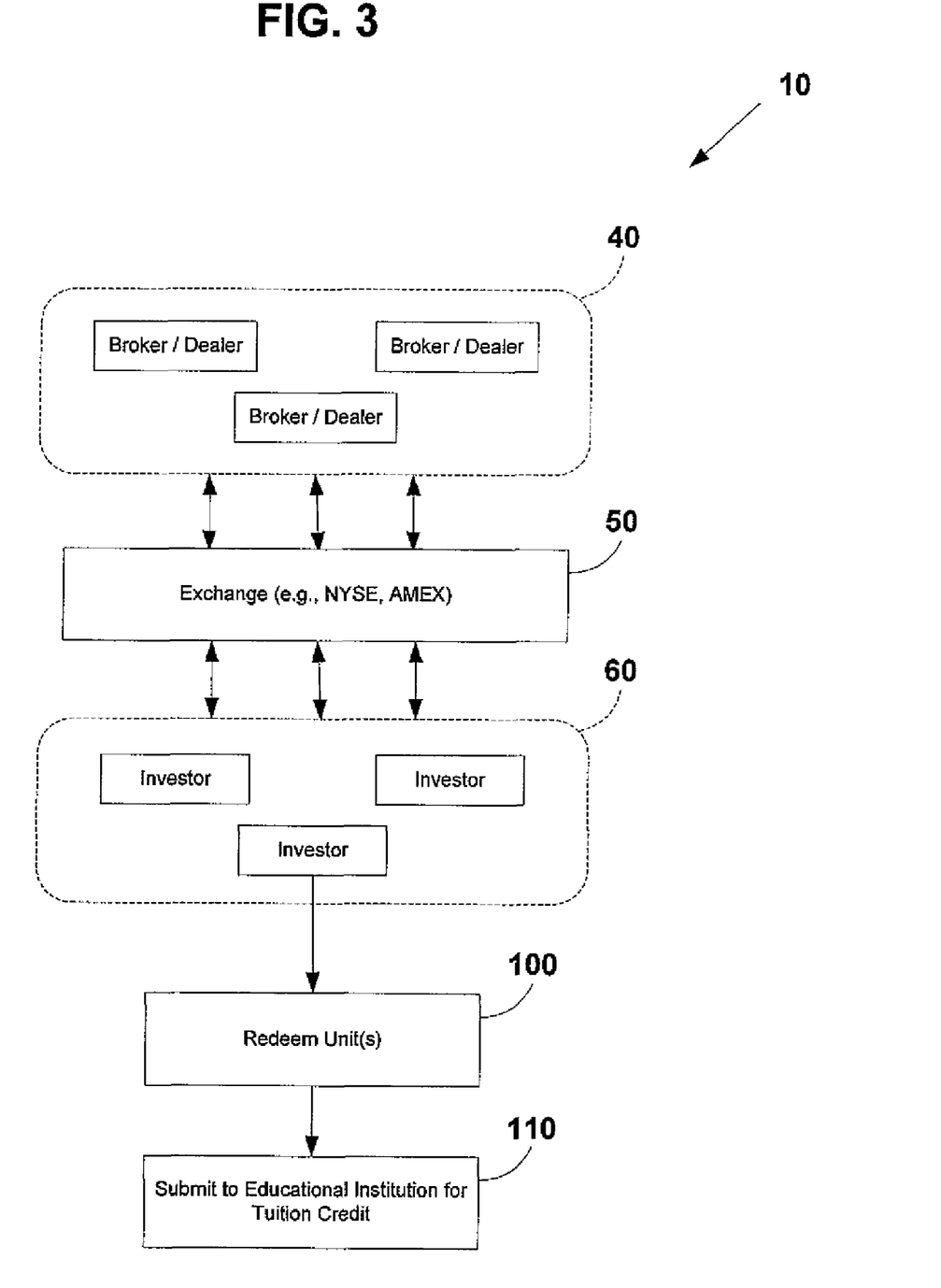
FIG. 3 is a diagram showing the educational tuition securities system of the present invention, wherein the tuition shares are traded on an exchange and can be redeemed for payment at a desired educational institution.

FIG. 3 is a diagram showing the educational tuition securities system 10 of the present invention, wherein educational securities are traded on an exchange and can be redeemed for payment at a desired educational institution. The investors 60 can actively trade shares over the exchange 50. For example, an investor can purchase and sell any desired number of shares in one or more educational institutions, and can trade such shares for shares in additional or other participating institutions. The investor can gift the shares to a future or current student, or redeem the shares for tuition credit at the educational institution. Additionally, the shares could be redeemed for cash through the educational institution (if authorized by the educational institution), or through selling the shares on the exchange.

As shown in block 100, one or more tuition shares can be redeemed and then submitted to an educational institution in block 110 for tuition credit and/or payment of education costs. For example, if a student has recently been admitted to a college and must begin making tuition payments, in block 100, the student can redeem a desired number of tuition shares from his or her brokerage account. Then, in block 110, the redeemed tuition shares can be submitted to the educational institution to pay tuition costs and/or education costs. Each tuition share could correspond to one or a fraction of a tuition credit, according to a fixed or fluctuating conversion rate determined by the educational institution. For example, a single tuition share at a given institution could correspond to one quarter of a tuition credit of coursework at the institution. Alternatively, the shares could be redeemed for cash (if permitted by the institution), and used to pay for tuition credit and/or education costs at the institution, such as books, room and board, etc. Moreover, if an educational institution conducts another issuance of tuition shares, such tuition shares could have a different conversion rate. A student can trade shares in one institution for tuition shares in another institution that the student is attending.

Figure 4:
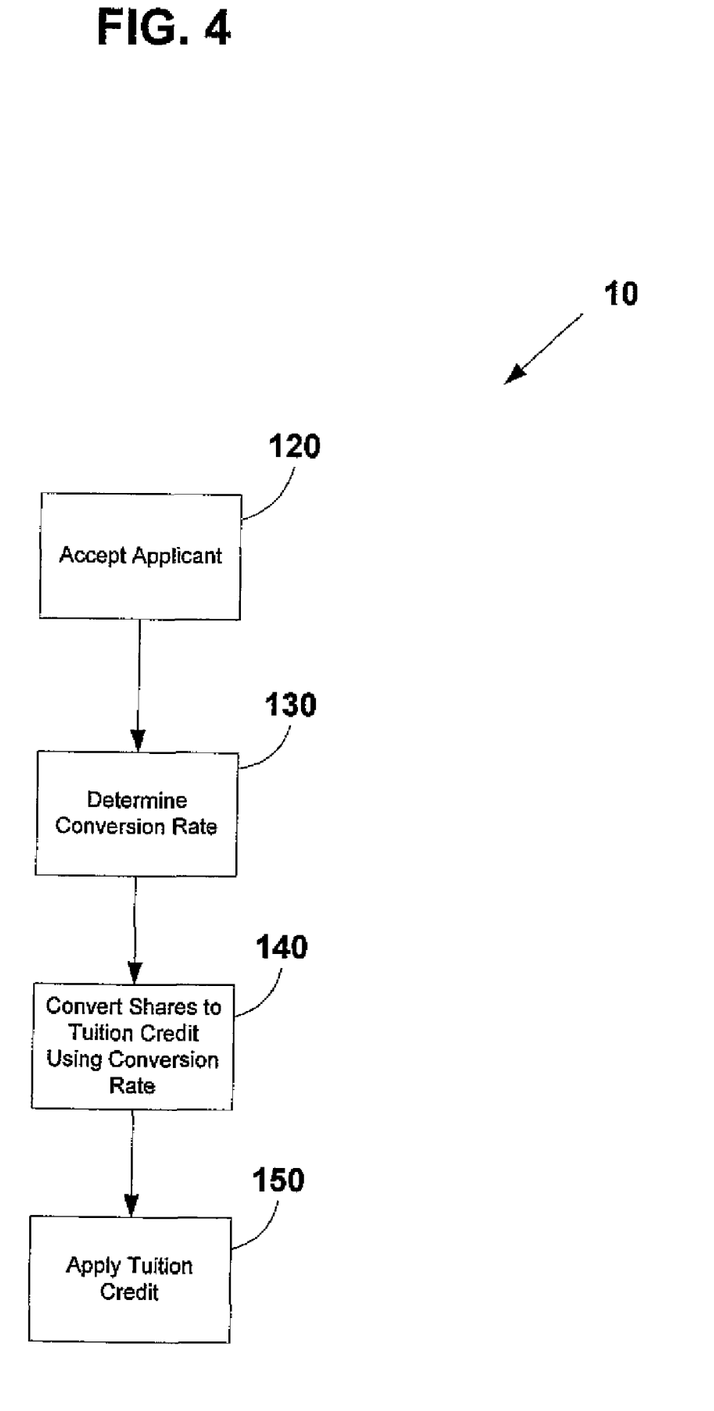
FIG. 4 is a flowchart showing the application process of the educational tuition securities system of the present invention in greater detail.

FIG. 4 is a flowchart showing the application process of the educational tuition securities system 10 of the present invention in greater detail. As mentioned earlier, an owner of tuition shares in an educational institution can redeem any desired number of shares, and use same to pay for tuition credits and/or education costs. In step 120, an applicant's request to redeem a given number of tuition shares for tuition credit and/or payment of education costs is accepted at the educational institution. Then, in step 130, a share-to-credit conversion rate is determined by the institution, so that the shares can be exchanged for tuition credit. The conversion rate can be any desired rate and can be set by the educational institution, typically upon issuance of the tuition shares. For example, at the time of an initial public offering, the educational institution could determine that one tuition share is equivalent to one quarter of a tuition credit. Regardless of economic conditions, e.g., economic market conditions, that could cause price fluctuations, the full one quarter tuition credit can be redeemed at the institution. In step 140, the shares are converted to tuition credit using the conversion rate. In step 150, the student is granted the tuition credits, which can be applied to the student's tuition. The tuition credits could be used to pay for coursework, or converted to cash to pay for education costs such as books or room-and-board, etc. It is commonly known and hence understood in the art that students often take one college course for three credits. Thus, based on the sample conversion rate mentioned above, twelve tuition shares, for example, might be converted to three tuition credits that a student could redeem at the educational institution in exchange for the course.

It should be noted that the present invention can be applied for use in both undergraduate and graduate studies, at public and private universities. For example, a parent or relative of a student could purchase a number of tuition shares in a desired undergraduate institution, as well as a number of tuition shares in a desired graduate institution. The shares could be redeemed regardless of a student's status (e.g., part-time or full-time).

Additionally, the tuition shares could provide an investment mechanism that can be used by investor for profit. Similar to shares in corporations, tuition shares in the educational institution can be purchased and actively traded with tuition shares of other institutions for profit. Tuition shares can be purchased and held for a period of time, such as a number of years, and then redeemed or sold for cash at a later date. The shares can appreciate with time, thereby providing an investment for the holder and allowing a purchaser to buy future tuition at a lower price.

Some additional advantages of the present invention include, but are not limited to: (a) the ability to generate future cash flows for educational institutions in the present, whereby the educational institution can invest funds to generate income in the present and for future income (similar to how insurance companies utilize asset liability investing to manage funds for insurance policies, payouts therefrom, etc.); (b) the ability to limit the number of shares that are redeemed per semester and/or the earliest date at which the shares can be redeemed (the purposes being to avoid the possible cash flow issues associated with having too many shares redeemed at the same time); (c) the use of funds to improve campuses, dormitories, and other facilities; (d) the ability of an educational institution to control the use of tuition shares (e.g., for tuition credit, books, room-and-board, meal plans, and other related fees); (e) the ability to control conversion rates between tuition shares and tuition credits; (f) the ability of investors to purchase tuition shares of one or more educational institutions; (g) the flexibility to sell tuition shares of one educational institution (possibly for profit) if a student does not attend that educational institution; (h) the ability to purchase tuition shares at a discount if shares are trading below initial offering prices; and (i) the use of tuition shares by full- or part-time students.

It is contemplated that the terms of the sale and/or issuance of a tuition share carry with it the right and/or possibility of dividend payment(s). For example, the educational institution might pay a dividend on the tuition share to the investor, e.g., parent, employer, etc. The dividend could be paid as cash, or other funds, or as a quantity of tuition credit, such as one-tenth of a credit, for example, which in the case of an employee tuition plan, might be provided as employee tuition credit or employee education costs.

It is also contemplated that a combination financial product could be offered to consumers having elements akin to the systems and/or methods described herein in combination with other financial products, such as 529 plans or Lifelong Accounts, for example. Moreover, the risks associated with the tuition shares may be subject to credit rating (not unlike traditional bonds or specialty bonds) such as by Standard and Poor's or other regulatory agencies that monitor companies.

Investors could be comprised of corporations, businesses or other employers, such as where the corporation has a tuition reimbursement plan or tuition assistance program for employees and desires to further extend such program by using tuition shares to cover the tuition of its employees. In such circumstances, it is contemplated that the selected tuition shares are those which are associated with an educational institution that is geographically near, e.g., within reasonable commuting distances, of an office of the employer. Of course, other educational institutions could be utilized and it is even possible that an employee could choose the institution from a number of choices.

Figure 5:
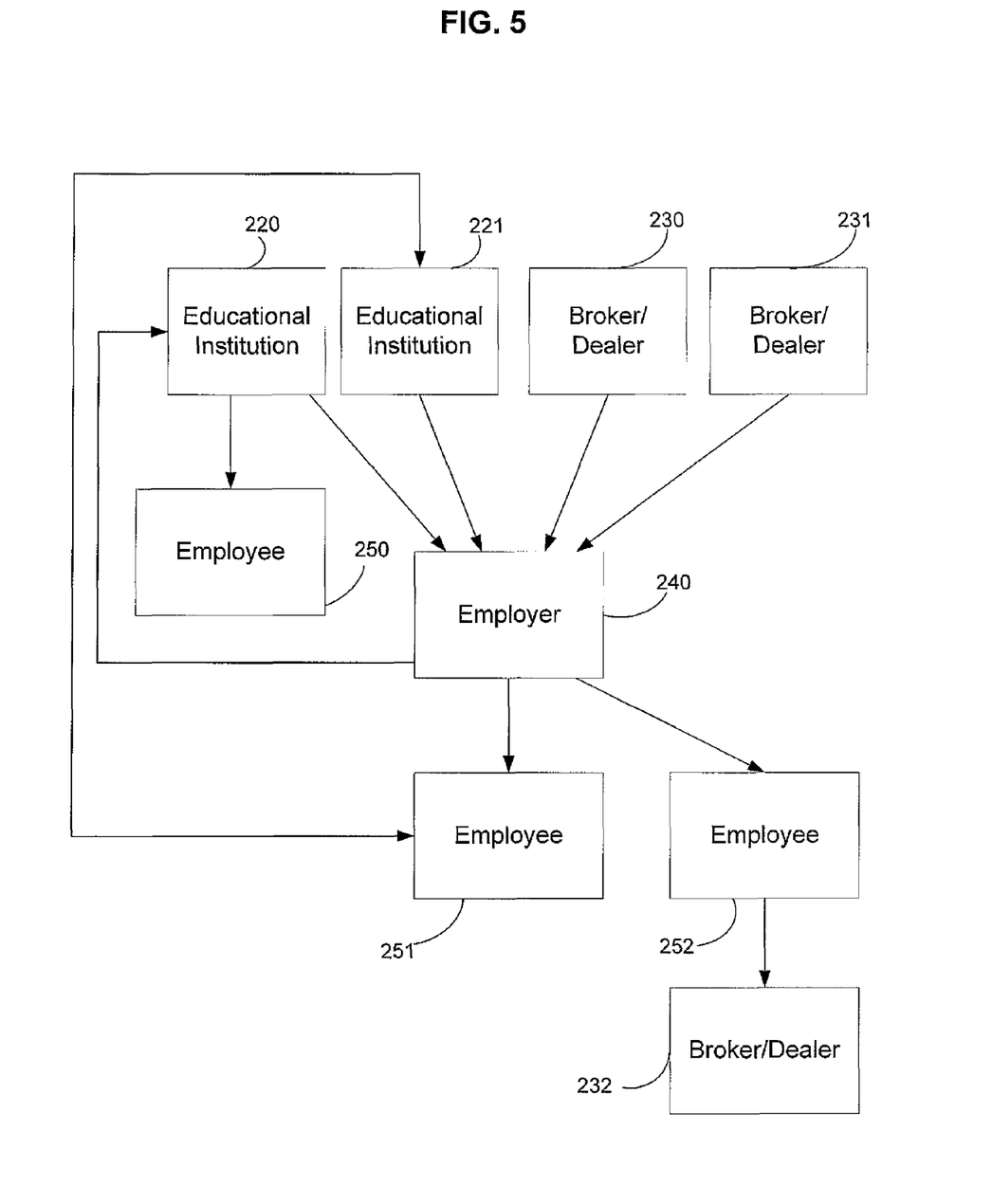
FIG. 5 is a diagram showing an educational tuition securities system of the present invention, wherein at least one employer has a tuition assistance program for employee(s) and/or dependents thereof.

As shown in FIG. 5, an employer 240 could purchase tuition shares from educational institutions 220, 221 and/or broker/dealers 230, 231 at an initial public offering or at a later date directly or via an exchange. The employer 240 could establish brokerage accounts or other employer accounts where tuition shares are held in the employer's name for future benefit of its employees, such as employee 250. The tuition shares could be directly placed in employee accounts, such as with respect to employees 251, 252.

In the example of employee 250, who is associated with an employer account, the employee 250 obtains appropriate approvals, and the employer 240 redeems tuition shares from the employer account(s) to pay for the educational institution 220, e.g., to at least partially cover tuition credit and/or education costs. The educational institution 220 provides educational services, for example, to the employee 250 associated with the employer account (and/or a dependent thereof, such as a spouse or child). In the example of employee 251, who is associated with an employee account, the employee 251 obtains appropriate approvals, the employer 240 transfers tuition shares from an employer account to the employee account, and the employee 251 could hold the tuition shares or could redeem the tuition shares from the employee account(s) to pay for a course at the educational institution 221, e.g., to at least partially cover tuition credits and/or educational costs. The educational institution 221 provides educational services, for example, to the employee 251 associated with the employee account (and/or a dependent thereof, such as a spouse or child).

In yet another example, an employee 252, who is associated with an employee account, might receive tuition shares into the employee account for a first educational institution from the employer 240. The employee 252 can exchange the tuition shares of the first educational institution for tuition shares of a second educational institution, such as by utilizing a broker/dealer 232, for example. It is contemplated that the employee 252 could be associated with an employer account, and that the employer 240 could exchange the shares via the broker/dealer 232.

Other arrangements for holding, transferring and using the tuition shares are also within the scope of the invention. For example, Lifelong Accounts (LiLA) could be used. Similar to a 401(k), this account is held in the employee's name, and can be used by the employee to cover education costs. The employer could match employee contributions. Employers could even outsource their tuition assistance programs to third parties such as The Council for Adult & Experiential Learning (CAEL). CAEL, or a similar organization, could implement tuition share redemptions on behalf of the employer.

Higher education lending institution could hold portfolios of tuition shares for various educational institutions. Once parents or students complete applications that have been approved, the lending institution could transfer shares into the students' name for the student to redeem at the education institution. Or the lending institution redeems the shares at the educational institution for the benefit of the student.

As yet another example, investors could be comprised of alumni groups, scholarship funds, foundations, and/or other awarding entities that grant educational awards for study. The awarding entity could establish a brokerage account where tuition shares are held. Beneficiaries, such as award recipients, can be awarded tuition shares that they can redeem for their courses of study. In such circumstances, the awarding entity could create accounts in its own name for the award recipients ("awarding entity accounts") and/or accounts in the name of the award recipient him or her self ("award recipient accounts"). A method of administering such awarding entity and/or award recipient accounts can be similar to that described with reference to FIG. 5, wherein the awarding entity is given similar treatment as the employer and the award recipient is given similar treatment as the employee.

Additionally, it is contemplated tuition shares can be combined to create other existing or new financial products. Tuition shares could be pledged for collateral notes, asset-based finance, or asset-based lending.

Having thus described the invention in detail, it is to be understood that the foregoing description is not intended to limit the spirit and scope thereof. What is desired to be protected by Letters Patent is set forth in the appended claims.

What is claimed is:

1. A method for providing educational tuition securities comprising: selling tuition shares in an educational institution to an investor to obtain advance payment for tuition credit or education costs for an educational institution, the tuition shares being redeemable at the educational institution to pay for tuition credit or education costs at the institution; and paying a dividend on the tuition shares to the investor.

2. The method of claim 1, wherein the step of paying the dividend to the investor comprises paying the dividend to the investor in the form of additional tuition shares for the educational institution.

3. The method of claim 1, further comprising allowing the tuition shares to be redeemed at the educational institution to pay for tuition credit or education costs at the institution.

4. The method of claim 3, wherein the step of allowing the tuition shares to be redeemed comprises: determining a conversion rate for converting the one or more shares to tuition credits; and converting the one or more shares to tuition credits using the conversion rate.

5. The method of claim 4, wherein the conversion rate is a fixed conversion rate.

6. The method of claim 1, wherein selling the tuition shares comprises selling the tuition shares over a computerized network.

7. A method by which an educational institution obtains advance payment for tuition credit or education costs, comprising: selling securities to an investor using a computerized network and in the form of tuition shares associated with a conversion rate for tuition credit or education costs for an educational institution; allowing the tuition shares to be traded on a computerized exchange to another investor; and paying a dividend on the tuition shares to at least one of the investor and the another investor.

8. The method of claim 7, wherein the step of paying the dividend comprises paying the dividend in the form of additional tuition shares for the educational institution.

9. The method of claim 7, comprising allowing at least one of the investor and the another investor to redeem the tuition shares with the educational institution in accordance with the conversion rate for the tuition credit or education costs for the educational institution.

10. The method of claim 9, wherein the tuition shares are associated with a price at a time of sale, and wherein the step of allowing the tuition shares to be redeemed comprises allowing redemption in accordance with the conversion rate substantially regardless of fluctuation in the price over time.

11. The method of claim 7, wherein the tuition credit or education costs for the educational institution is tuition credit for the educational institution, and wherein the conversion rate is a share-to-credit conversion rate for the educational institution.

12. The method of claim 7, wherein the conversion rate is a fixed conversion rate.

13. A method of enabling advance payment to educational institutions and providing tuition credit and/or educational costs for employees, comprising: buying tuition shares associated with a price and further associated with a conversion rate for tuition credit or educational costs for an educational institution; associating the tuition shares with an account for an employee of an employer; and, in accordance with the conversion rate, redeeming the tuition shares for tuition credit or education costs for the educational institution for at least one of the employee and a dependent thereof.

14. The method of claim 13, wherein the step of redemption comprises redeeming the tuition shares in accordance with the conversion rate substantially regardless of fluctuation in the price over time.

15. The method of claim 13, wherein the account comprises an employer account.

16. The method of claim 13, wherein the account comprises an employee account.

17. The method of claim 13, further comprising selecting the educational institution in accordance with a desired geographic proximity between the educational institution and at least one office of the employer.

18. The method of claim 13, further comprising receiving a dividend on the tuition shares.

19. The method of claim 18, wherein the step of receiving the dividend comprises receiving the dividend in the form of additional tuition shares.

20. A method of enabling advance payment to educational institutions and providing tuition credit and/or educational costs for award recipients of educational award, comprising: buying tuition shares associated with a price and further associated with a conversion rate for tuition credit or educational costs for an educational institution; associating the tuition shares with an account for an award recipient of an educational award from an awarding entity; and, in accordance with the conversion rate, redeeming the tuition shares for tuition credit or education costs for the educational institution for the award recipient.

21. The method of claim 20, wherein the step of redemption comprises redeeming the tuition shares in accordance with the conversion rate substantially regardless of fluctuation in the price over time.

22. The method of claim 20, wherein the awarding entity is an entity associated with at least one of a scholarship fund, an alumnus organization, and a foundation.

23. A method of allowing an entity to provide a gift or award to an awardee in the form of educational tuition shares, comprising: purchasing, by the entity, tuition shares issued by an educational institution; gifting the tuition shares to an awardee; and allowing the awardee to use the tuition shares.

* * * * *